United States Patent [19]

Nottelmann et al.

[11] Patent Number: 4,948,318
[45] Date of Patent: Aug. 14, 1990

[54] NON-CORROSIVE HEADED COMPOSITE FASTENERS AND A METHOD OF PRODUCING THE SAME

[75] Inventors: Donald A. Nottelmann, East Bend; Norman G. Wallace, Statesville; Joseph E. Stager, Charlotte, all of N.C.

[73] Assignee: Textron, Inc., Providence, R.I.

[21] Appl. No.: 332,718

[22] Filed: Apr. 3, 1989

[51] Int. Cl.⁵ .................. F16B 19/00; F16B 33/00; F16B 43/00
[52] U.S. Cl. .................. 411/377; 411/431; 411/915; 10/86 C
[58] Field of Search .............. 411/371, 372, 373, 377, 411/431, 429, 903, 908, 915; 10/86 C; 264/275–278

[56] References Cited

U.S. PATENT DOCUMENTS

| | | |
|---|---|---|
| D. 248,014 | 8/1976 | DeCaro . |
| 1,867,354 | 3/1931 | Dickson . |
| 2,079,056 | 3/1935 | Warren . |
| 3,452,636 | 6/1967 | Cohen et al. . |
| 3,693,495 | 10/1970 | Wagner . |
| 3,803,972 | 8/1972 | Deutsher . |
| 3,897,712 | 8/1975 | Black ................. 411/373 |
| 4,041,834 | 8/1977 | Herkes et al. ......... 411/915 |
| 4,154,138 | 5/1979 | Melone ............... 411/373 |
| 4,295,767 | 11/1979 | Temple, Jr. . |
| 4,373,842 | 2/1983 | Bettini et al. ......... 411/903 |
| 4,452,556 | 6/1984 | Nelson et al. ......... 411/903 |

FOREIGN PATENT DOCUMENTS 625345 5/1947 United Kingdom .

Primary Examiner—Neill R. Wilson
Attorney, Agent, or Firm—Webb, Burden, Ziesenheim & Webb

[57] ABSTRACT

Disclosed is a composite fastener that includes a metal fastener having a shank with an entrant end and an integral insert. A bottom surface of the insert has a greater diameter than the diameter of the shank. The bottom surface also has a lip extending about the periphery of the shank, which during manufacturing of the composite fastener forms a seal against a shuttle for preventing molten material from running down the shank. Further, the insert includes a configuration for supporting a shuttle pin, such as shuttle pin receiving receptacle, to align the metal fastener in a shuttle. A non-corrosive head made of the extrudable material, such as zinc, encapsulates the insert. A method for manufacturing the composite fastener is also disclosed.

15 Claims, 4 Drawing Sheets

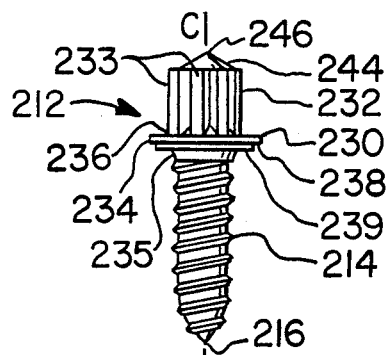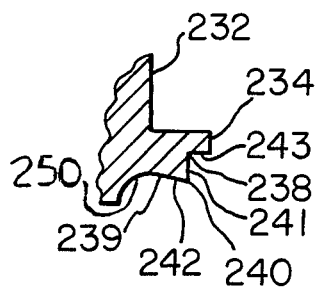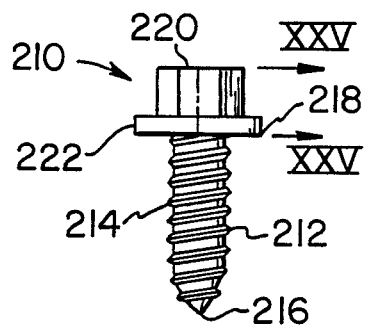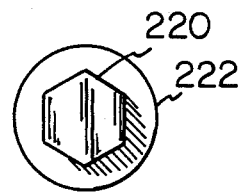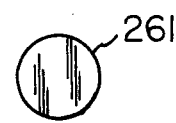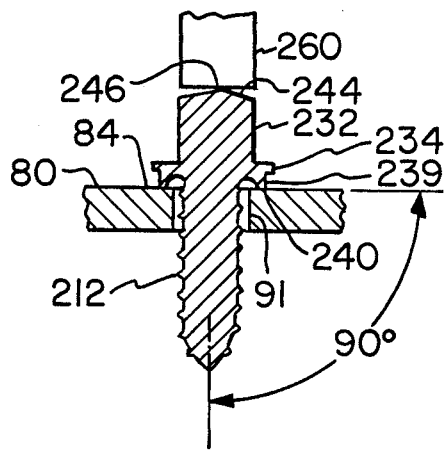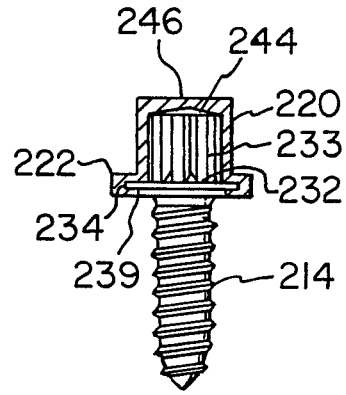

NON-CORROSIVE HEADED COMPOSITE FASTENERS AND A METHOD OF PRODUCING THE SAME

FIELD OF THE INVENTION

This invention relates to composite fasteners and a method of producing the same. More particularly, the invention relates to a self-tapping composite fastener which includes a metal fastener having a metal insert on one end of the shank encapsulated by a head of non-corrosive material, such as aluminum, plastic or zinc material.

DESCRIPTION OF THE PRIOR ART

A number of composite fasteners to attach metal siding to buildings have been developed. Typically, these composite fasteners comprise a hardened, forged steel shank and a composite washer/head combination of a non-corrosive material such as zinc, aluminum or plastic. The hardened steel shank permits easy self-drilling and tapping of a siding and building support structure, while the head is not affected by rusting or corrosion due to the outdoor elements. If composite fastener heads were made of a hardened non-stainless steel, they would tend to rust and be aesthetically unappealing. Furthermore, such fasteners could corrode to a point where they would loosen and become a safety hazard.

Composite fastener heads can take the form of any shape, such as square or hexagonal. To install a hex-headed composite fastener for the above-described purposes, an installer typically attaches a hex-headed adaptor to an electric drill and places the composite fastener head into the fastener head receiving end of the adaptor. The installer then places the composite fastener drill tip against a panel of metal siding abutting a building structure and activates the drill. The composite fastener is then driven into threadable engagement with the siding and the building structure so that a bottom surface of the composite fastener head is flush with and presses against the siding. This eliminates high stress concentrations that could cause the composite fastener to fail.

As stated, aluminum, plastic or zinc material has been used in prior composite fasteners for encapsulating hardened steel heads as described in U.S. Pats. Nos. 3,803,972, 3,693,495, and 4,295,767, respectively. Each of these fasteners has certain drawbacks. The aluminum encapsulated fastener described in U.S. Pat. No. 3,803,972 is difficult and time-consuming to fabricate. Further, the aluminum head tends to be malleable and prone to strip at high bolt torques.

The plastic encapsulated fastener described in U.S. Pat. No. 3,693,495 can be fabricated by extrusion and, therefore, can be fabricated more quickly. However, the plastic encapsulated head is still malleable and can strip under high torques. Further, the rejection rate of these fasteners can be high because of the difficulty in properly aligning the lower surface of the plastic encapsulated head with the steel shank so that a longitudinal axis passing through the shank is perpendicular to the lower surface—a necessary requirement for these fasteners. Additionally, extruded plastic may flow down the shank rendering the fastener useless if the steel fastener is not properly aligned with the molding die for the plastic. Therefore, this type of fastener has a high fabrication rejection rate.

It is, therefore, an object of our invention to provide a composite metal fastener with a steel shank having on one end a metal insert encapsulated by a head of non-corrosive material, such as aluminum, plastic or zinc. Another object is to provide a method of producing such a fastener which is quick and inexpensive and which does not have a high rejection rate.

SUMMARY OF THE INVENTION

In one embodiment of our invention in which extrudable material, such as aluminum, plastic or zinc is used to encapsulate the fastener head, a composite fastener comprises a metal fastener including a hardened metal shank having on one end a driving or threaded section and on the opposite end an insert. A lower portion of the insert is integrally joined to an upper portion of the shank. The lower portion of the insert is in the form of a washer which has a greater area than the area of the upper portion of the shank to which it is joined. The lower portion of the insert also extends outwardly and near the outermost edge includes a downwardly projecting lip. During manufacture of the fastener according to our method, the lip forms a seal against a mold shuttle to prevent extruded material from flowing therearound and from running down the shank.

The upper portion of the insert includes a configuration for supporting a shuttle pin to align the fastener in the shuttle during manufacture of the fastener, while the extrudable material, such as zinc, encapsulates the fastener insert.

A preferred configuration for the top surface of the insert is a recess which is coaxial with the shank. The metal insert may also include a plurality of spaced splines extending longitudinally of the insert about an outer surface thereof.

In a second embodiment of our invention, a metal fastener made of a material, such as hardened steel, includes a shank having on one end an integral insert encapsulated with an extrudable material, such as aluminum, plastic or zinc. The bottom portion of the insert is the same as described in respect to the earlier embodiment. The upper portion of the insert includes a configuration which is adapted to engage the shuttle pin to properly align the fastener in the shuttle during fabrication of the composite fastener.

Additionally, the insert may include a plurality of risers having surfaces extending from the upper portion of the insert to receive the shuttle pin thereon. The risers can be tapered toward the center of the shank to provide a configuration to receive a shuttle pin, preferably a shuttle pin having a frusto-spherical tip.

Our method for manufacturing a composite fastener according to the invention includes placing a metal fastener into a metal fastener receiving bore of a conventional mold shuttle having a flat surface such that a bottom surface of the fastener insert rests thereupon. Next, the shuttle is placed in the mold where the fastener is aligned with a shuttle pin. The shuttle pin engages with the configuration on the upper surface of the insert for supporting and aligning the insert, and the lip provided on the lower surface of the insert forms a seal which prevents extrudable material, such as aluminum, plastic or zinc, from reaching the shank during injection molding. Finally, the extrudable material is injected into the mold and encapsulates the insert on the end of the shank forming a composite fastener.

BRIEF DESCRIPTION OF THE DRAWINGS

FIG. 17 is an elevation view of another composite fastener made in accordance with the present invention;

FIG. 18 is a top view of the fastener of FIG. 17;

FIG. 19 is a partial elevation view of another metal fastener made in accordance with the present invention;

FIG. 20 is a top view of the metal fastener of FIG. 19;

FIG. 21 is a section of a portion of the metal fastener washer and lip of FIG. 19;

FIG. 22 is a partial elevation view of a shuttle pin;

FIG. 23 is a bottom view of the shuttle pin of FIG. 22;

FIG. 24 is a partial view, in section, of the shuttle pin of FIG. 22 properly engaged with the metal fastener of FIG. 19; and FIG. 25 is a section taken along lines XXV—XXV of FIG. 17.

DESCRIPTION OF THE PREFERRED EMBODIMENTS OF THE INVENTION

Figure 1:
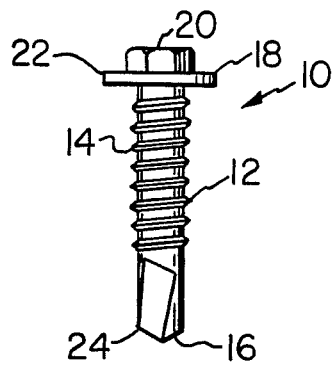
FIG. 1 is a side elevation view of a composite fastener made in accordance with the invention.
Figure 2:
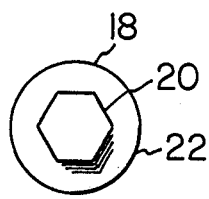
FIG. 2 is a top view of the fastener of FIG. 1.
Figure 6:
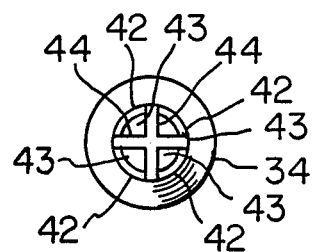
FIG. 6 is a top view of the metal fastener of FIG. 3.
Figure 4:
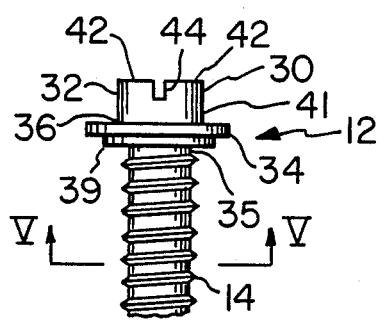
FIG. 4 is a partial elevation view of the metal fastener of FIG. 3.
Figure 5:
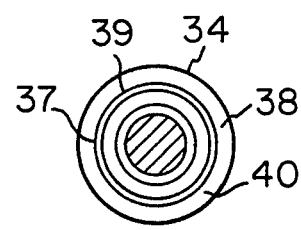
FIG. 5 is a section taken along lines V—V of FIG. 4.
Figure 3:
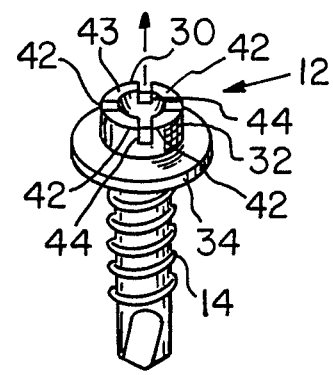
FIG. 3 is a perspective view of one embodiment of a metal fastener made in accordance with the present invention.

A typical self-tapping composite fastener is generally designated by the numeral 10 and is shown in FIGS. 1 and 2. The fastener 10 includes a metal fastener 12 having a threaded shank 14 with an entrant end 16 and a head portion 18 of non-corrosive material encapsulating the upper end of the shank. Preferably, the noncorrosive material is zinc. The encapsulated head portion 18 includes a hexagonally-shaped head 20 including an integral washer 22 intermediate head 20 and the threaded shank 14. The threaded shank 14 further includes both a drill tip 24 at the shank entrant end 16 and self-tapping threads.

In a first embodiment of our invention, metal fastener 12, shown in FIGS. 3-6, is characterized by an upper portion 30 preferably in the form of a cylindrical insert 32. A circular washer 34 is integrally formed with the insert and lies between an upper end 35 of shank 14 and a lower section 36 of insert 32. The outer diameter of washer 34 is substantially greater than the outer diameters of either insert 32 or shank 14. A lower surface 38 of washer 34 has a continuously downwardly extending circular lip 39 having a generally U-shaped cross-section positioned slightly radially inwardly from the peripheral edge of the washer 34. The lip 39 defines a radially extending ledge 40 between the peripheral edge of the washer and washer lip 39. The washer lip 39 can have any cross-sectional shape, e.g. curvilinear or polygonal, so long as it provides a downwardly extending lip 39 with a depending edge 37 which acts as a sealing edge during manufacture of the composite washer.

A cylindrical section 41 extends upwardly from the upper surface of washer 34. The section 41 includes four similarly-shaped risers 42, each having an upper surface 43 which is tapered downwardly and inwardly toward a longitudinal axis A which is coincident with the axis of shank 14. Two channels 44 are cut to form a cross across the top surface insert 32 and intersect each other at right angles to form separate risers 42. During manufacture of the composite fastener, the channels 44 are filled with extrudable material to bond the noncorrosive head to the insert so that high torques can be applied to composite fastener 10 during installation of the fastener.

Figure 7A:
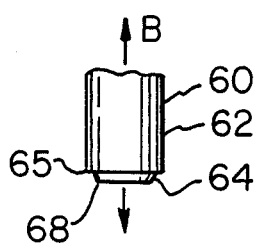
FIG. 7 is a partial elevation view of a shuttle pin.
FIG. 7B is a bottom view of the shuttle pin of FIG. 7A.
Figure 7B:
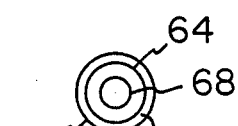

The configuration in the top surface of the insert defined by risers 42 is adapted to receive a shuttle pin 60, shown in FIGS. 7A and 7B, during production of the composite fastener. The shuttle pin 60 is used during the molding of non-corrosive head portion 18 about insert 32 of metal fastener 12 and ensures the proper alignment of the fastener during the injection molding operation.

More specifically, a preferred shuttle pin 60 includes a cylindrical shaft 62 and a frusto-spherical tip 64 positioned at the distal end 65 of shaft 62, all of which are symmetric about a longitudinal axis B passing therethrough. A circular shoulder 66 is formed between the outer edge of shaft 62 and the outer edge of tapered shaft end 65. The end of the shuttle pin 60 includes a flat surface 68 for engagement with the configuration of a metal fastener during production of the composite fastener.

As stated previously, risers 42 form a shuttle pin receiving receptacle 70, wherein the frusto-spherical tip 64 of shuttle pin 60 can be received between risers 42 and rest on upper surfaces 43 of the metal fastener. The shuttle pin tip 64 and receptacle 70 can be formed in any manner so long as they are sufficiently complementary to permit engagement with each other. For example, the shape of the shuttle pin tip can be frusto-conical, frusto-polygonal or frusto-eliptical and the fastener insert configuration can be modified accordingly to receive these shapes. Moreover, the shuttle pin may have an indentation adapted to receive a metal fastener insert having one of the above-mentioned shapes.

Figure 9:
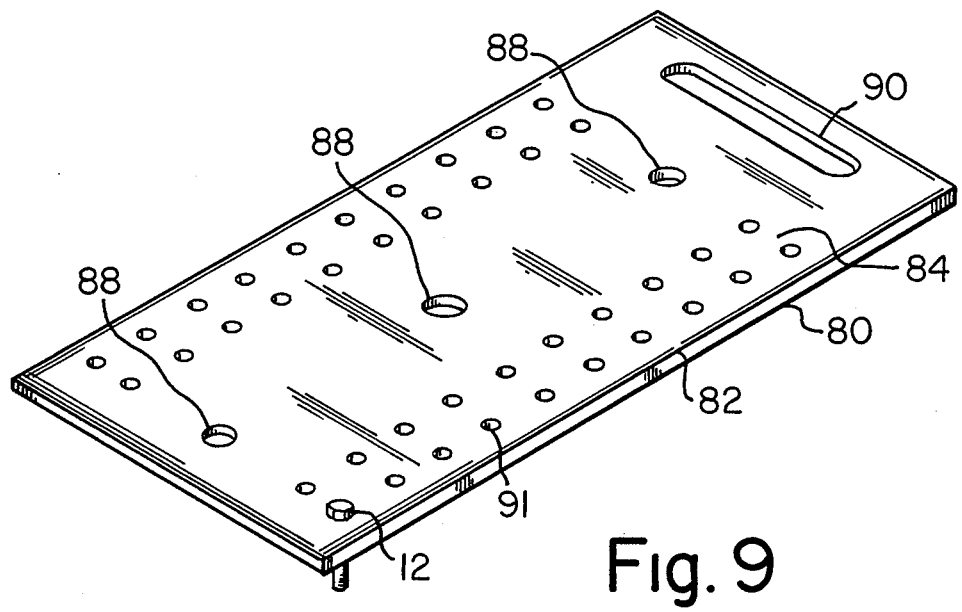
FIG. 9 is a perspective view of a shuttle for the device of FIG. 8.
Figure 8:
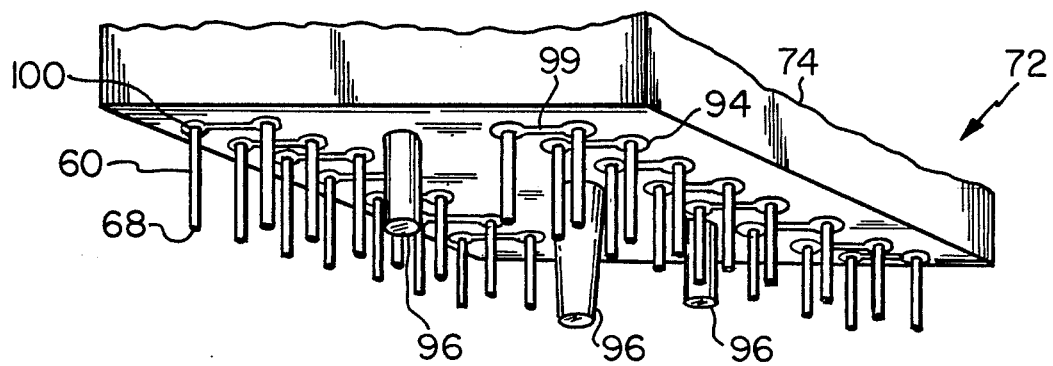
FIG. 8 is a perspective view of a part of a zinc injection molding device.
Figure 8:
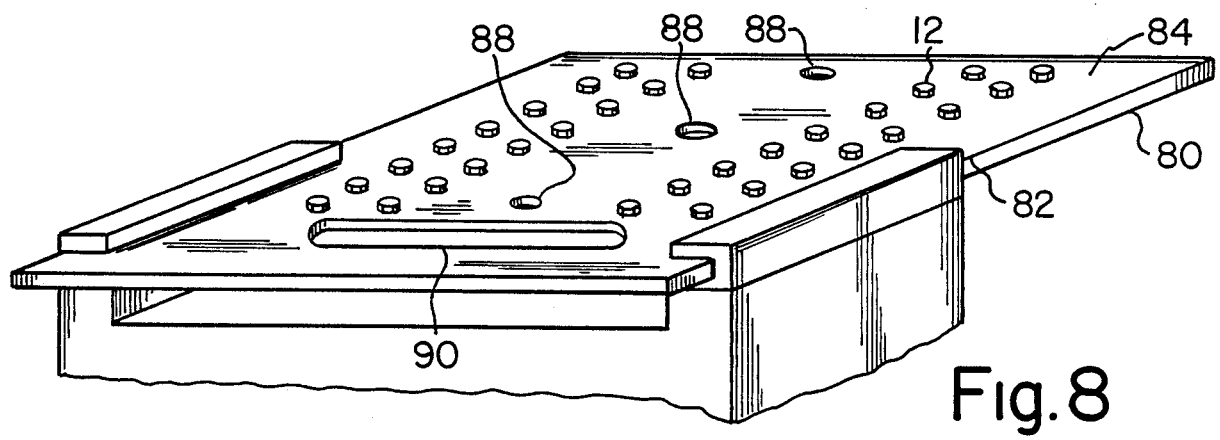

A typical injection molding device 72 having a removable shuttle is shown schematically in FIGS. 8 and 9 of the drawings. As shown in FIG. 8, a shuttle pin 60 is used in the device 72 which includes an upper mold die 74 as is well-known in the art. Shuttle 80, as shown in FIG. 9, includes a flat plate 82 having a flat upper surface 84, guide holes 88 for receiving upper mold die guides and a handle 90. Each side of plate 82 has two rows of metal fastener receiving bores 91 passing therethrough. The diameter of each bore 91 is greater than the diameter of shank 14 and smaller than the outer diameters of both washer portion 34 and lip 39. Thus, when shank 14 passes through bore 91, the lip 39 rests upon flat upper surface 84 such that longitudinal axis A passing through shank 14 is perpendicular to surface 84.

Upper mold die 74 includes a plurality of hexagonally shaped cavities 94 and two mold die guides 96 which are adapted to be slideably received by respective shuttle guide holes 88. Runners 99 connect respective cavities 94 to a source of molten extrudable material, such as aluminum, plastic or zinc. Each shuttle pin 60 is aligned with and is adapted to be slideably received in a shuttle pin aperture 100 with the tips 64 of the pins extending downwardly. The opposite end of shuttle pin 60 (not shown) may be spring loaded and have a pressurized force applied thereto, such as by pneumatics or hydraulics, as is conventional in the art.

Figure 10:
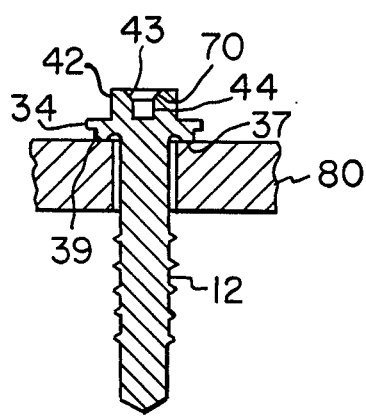
FIG. 10 is a partial side view, in section, of a metal fastener resting in a shuttle of the type shown in FIGS. 8 and 9.

In the manufacture of composite fasteners 10 according to the invention, an operator typically inserts a metal fastener 12 into each shuttle receiving bore 91 so that the fastener is properly aligned perpendicular to the plane of the shuttle and the lip 39 bears against the shuttle surface, as shown in FIG. 10. Then the operator inserts shuttle 80 into the molding device 72 via guide slots 101 and activates the molding device 72 so that upper mold die 74 engages the shuttle 80. As mold die guides 96 enter shuttle guide holes 88, shuttle 80 becomes properly aligned with mold die 74 so that shuttle pins 60 are positioned directly above their respective receptacles 70.

Figure 11:
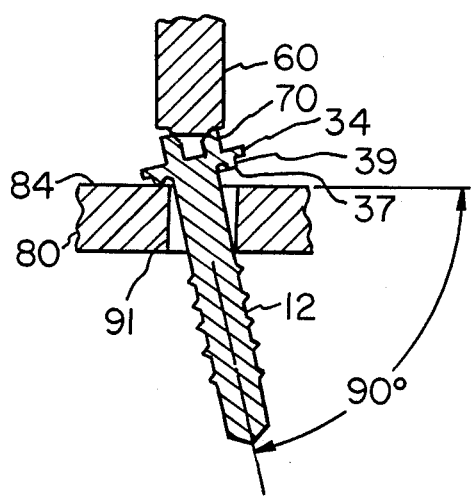
FIG. 11 is a partial side view, in section, of a shuttle pin improperly engaging an insert of a metal fastener.
Figure 12:
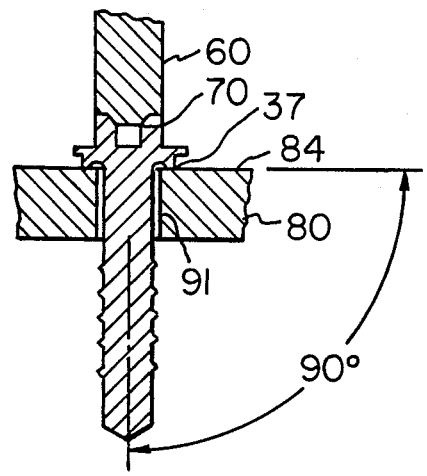
FIG. 12 is a partial side view, in section, of a shuttle pin properly engaged with the metal fastener insert.

Heretofore, during this metal process, metal fasteners have become cockeyed with respect to upper surface 84 of the shuttle as shown in FIG. 11. According to the present invention, however, proper alignment is insured. As shown in FIG. 12, as the tip 68 of the shuttle pin travels into position between risers 42 and shuttle pin tip 64 rests therein, the metal fastener 12 will automatically assume the proper alignment with edge 37 resting on surface 84 in a plane perpendicular to the longitudinal axis A through the shank of the fastener.

Preferably, the upper surface 84 of the shuttle should be a flat surface, although it is necessary that only that portion adjacent bores 91, on which edges 37 rest, be flat so that a seal can be formed between lip 39 and the surface of the shuttle. When receptacle 70 receives shuttle pin 60, the forces applied to the shuttle pin 60 are distributed equally about the edge 37 of the lip 39.

Upon engagement of the shuttle pins in the receiving bores, pressure is applied to the shuttle pin 60, via the springs or other means, causing the lip edge 37 to form a seal with shuttle 80 to prevent the molten material from flowing past the seal and onto threaded shank 14.

Figure 14:
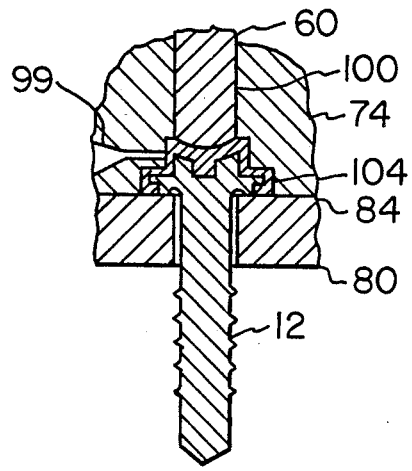
FIG. 14 is a partial side view, in section, of the zinc mold die positioned over the metal fastener insert with the insert encapsulated by zinc to form the head.
Figure 13:
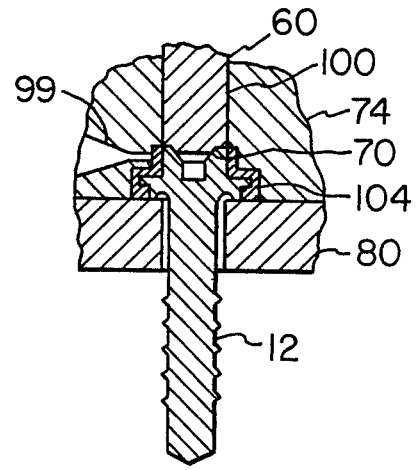
FIG. 13 is a partial side view, in section, of a zinc mold die, positioned over the metal fastener insert.

The molten material 104 extrudes into the cavity 94 encapsulating the insert and forming the head 20. The bottom surface of the head is thus enhanced in a plane perpendicular to longitudinal axis A as shown in FIGS. 13 and 14. The molten material 104 flows around the metal insert, under and surrounds bottom ledge 40 to the seal provided by edge 37 so that when the material 104 solidifies, the head 20 and washer 22 cannot be separated from insert 30. As material is extruded, pressure from the material causes shuttle pin 60 to withdraw slightly from shuttle pin receiving aperture 100 forming a slight depression 110 in head 20.

Figure 15:
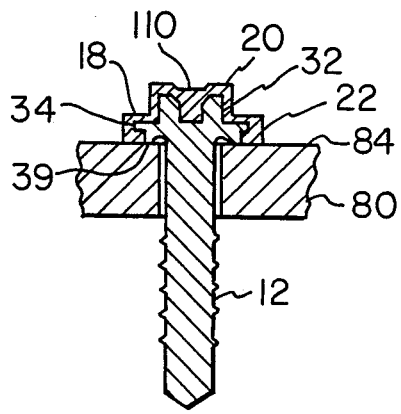
FIG. 15 is a partial side view, in section, of the zinc encapsulated metal fastener insert resting on the shuttle after the zinc mold die is removed.
Figure 16:
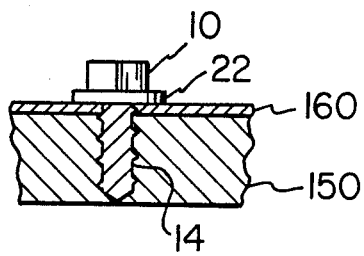
FIG. 16 is a side view in partial section of the composite fastener of FIG. 1 mounted in a building structure.

After the molten material 104 cools and solidifies, the operator raises upper mold die 74. The spring loaded shuttle pins 60 eject composite fasteners 10 from cavities 98 onto the shuttle 80 so that the composite fasteners can easily be removed therefrom, as shown in FIG. 15. A composite fastener 10 so formed is useful to attach siding 160 to a building structure 150 as shown in FIG. 16.

A second embodiment of our composite fastener, generally designated 210 and shown in FIGS. 17 and 18, includes a metal fastener 212 having a threaded shank 214 with an entrant end 216 and an insert 218. The insert 218 is encapsulated with a hexagonally shaped head 220 and an integral washer 22 positioned between head 220 and an end of shank 214 by non-corrosive material, such as aluminum, plastic or zinc.

Metal fastener 212, shown in FIGS. 19–21, includes a top portion 230 having a cylindrical insert 232 with a plurality of spaced longitudinal extending spines 233 about its outer surface. An integral circular washer 234 is formed between an upper end 235 of shank 214 and insert 232. A longitudinal axis C through the center of shank 214 is coaxial with the axis of insert 232. The outer diameter of washer 234 is greater than the outer diameter of both insert 232 and shank 214. A lower surface 238 of washer 234 has a continuous downwardly extending circular lip 239 having a lowermost edge 240 positioned inwardly from the washer outer peripheral edge. The lip 239 may have any cross-sectional shape, e.g., curvilinear or polygonal, so long as it has a lowermost edge for reaching engagement with a shuttle during fabrication of a composite washer.

Surface 241 is symmetrical about axis C. The angle formed at the intersection of surfaces 241, 242 is less than 90°. Surface 242 also defines a radially extending recessed annular space 250 adjacent thereto. We have found that an 85° angle is sufficient. Furthermore, lip 239 defines a bottom ledge 243 between the edge of the washer and lip 239.

Insert 232 has a conical top surface 244 having an apex 246 coaxial with shank 214. Top surface 244 can be any shape which extends about head 232. When shuttle pin 260, having a flat tip 261, exerts a force on apex 246 along axis C, lowermost edge 240 distributes the force equally along a flat upper surface, such as the upper surface 82 of the shuttle. Any force exerted on apex 246 and along axis C will not create a moment which causes the metal fastener 212 to become cockeyed. See FIGS. 22–24.

The method of manufacturing composite fastener 210 including metal fastener 212 is the same as that used for composite fastener 10 except that shuttle pin 260 replaces shuttle pin 60. When molten material 104 encapsulates top portion 230 of metal fastener 212, it appears as shown in FIG. 25. The molten material fills the spaces between splines 233 of the insert forming a strong head that will not strip at high torques. Further, as in the case of fastener 10, the molten material flows along the underside of washer bottom ledge 243 to edge 240 where further flow is prevented by the seal so that head 220 and washer 222 cannot be separated from the metal fastener when the zinc solidifies.

Having described the presently preferred embodiments of the invention, it is to be understood that it may otherwise be embodied within the scope of the appended claims.

We claim:

1. A composite fastener comprising a metal fastener having a shank with an entrant end and an integral insert having a bottom surface, said bottom surface of said insert having a greater outer diameter than the diameter of said shank, said insert including a plurality of upwardly extending longitudinal risers attached thereto having upper surfaces, wherein each of said riser upper surfaces is tapered downwardly and inwardly toward a longitudinal axis which is coincident with the axis of said shank, said risers adapted to receive a frusto spherical tipped shuttle pin therebetween; and a non-corrosive head made of an extrudable material encapsulating said insert.

2. The composite fastener of claim 1 wherein said extrudable material comprises zinc.

3. The composite fastener of claim 1 wherein said metal fastener further includes a washer integrally formed with said insert and positioned between said insert and said shank, said washer having an outer diameter greater than the diameter of said insert and the diameter of said shank.

4. The composite fastener of claim 3 wherein a lower surface of said washer includes a lip extending peripherally thereabout.

5. The composite fastener of claim 4 wherein said lip has a depending edge which acts as a sealing edge during manufacture of the composite fastener.

6. A composite fastener comprising a metal fastener having a shank with an entrant end and an integral insert having a bottom surface, said bottom surface of said insert having a greater outer diameter than the diameter of said shank, and said bottom surface having a lip extending peripherally thereabout, said lip including a first surface defining a radially extending recessed annular space adjacent to said first surface, a second surface intersection with said first surface, and a lowermost edge for engagement with a shuttle formed at the intersection of said first surface and said second surface, said insert including a configuration for supporting a shuttle pin to align said metal fastener in the shuttle, said configuration having a conical top surface having an apex, said apex being the uppermost point of said insert, whereby during manufacture of said composite fastener the shuttle pin exerts a force against said apex and said lowermost edge then distributes the force equally along an upper surface of the shuttle so that said lowermost edge forms a seal against the shuttle for preventing molten extrudable material from running down said shank; and a non-corrosive head made of an extrudable material encapsulating said insert.

7. The fastener of claim 6 wherein said conical top surface and said insert are coaxial with said shank.

8. The fastener of claim 6 wherein said insert includes a plurality of spaced longitudinal extending splines about an outer surface thereof.

9. The fastener of claim 6 wherein said lip includes inclined surfaces which form said lowermost edge.

10. The fastener of claim 6 wherein said extrudable material comprises zinc.

11. The fastener of claim 6 wherein said first surface and said second surface intersect at an angle to form said lowermost edge, wherein the angle is less than 90°.

12. The fastener of claim 11 wherein said angle is 85°.

13. A composite fastener comprising a metal fastener having a shank with an entrant end and an integral insert having a bottom surface, said bottom surface of said insert having a greater outer diameter than the diameter of said shank, and said bottom surface having a lip extending peripherally thereabout, said lip including an inclined first surface defining a radially extending annular recessed space adjacent thereto, an inclined second surface intersecting with said first surface and a lowermost edge for engagement with a shuttle formed at the intersection of said first surface and said second surface, said insert having a conical top surface coaxial with said shank, said conical surface having an apex for supporting a shuttle pin to align said metal fastener in a shuttle, said apex being the uppermost point of said insert, whereby during manufacture of said composite fastener the shuttle pin exerts a force on said apex and said lowermost edge then distributes the force equally along an upper surface of the shuttle so that said lowermost edge forms a seal against the shuttle for preventing molten zinc from running down said shank, and said insert having a plurality of spaced longitudinal extending splines about an outer surface thereof; and a non-corrosive head made of zinc encapsulating said insert.

14. The fastener of claim 13 wherein said first surface and said second surface intersect at an angle to form said lowermost edge, wherein the angle is less than 90°.

15. The fastener of claim 14 wherein said angle is 85°.

* * * * *